(12) United States Patent
Kumar

(10) Patent No.: US 11,680,631 B2
(45) Date of Patent: Jun. 20, 2023

(54) PUMP GEAR

(71) Applicant: SPM Oil & Gas Inc., Fort Worth, TX (US)

(72) Inventor: Chandu Kumar, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 78 days.

(21) Appl. No.: 16/766,837

(22) PCT Filed: Dec. 6, 2018

(86) PCT No.: PCT/US2018/064264
§ 371 (c)(1),
(2) Date: May 26, 2020

(87) PCT Pub. No.: WO2019/113325
PCT Pub. Date: Jun. 13, 2019

(65) Prior Publication Data
US 2020/0370633 A1 Nov. 26, 2020

Related U.S. Application Data

(60) Provisional application No. 62/595,272, filed on Dec. 6, 2017.

(51) Int. Cl.
*F16H 55/17* (2006.01)
*F04B 9/02* (2006.01)
(Continued)

(52) U.S. Cl.
CPC ............... *F16H 55/17* (2013.01); *F04B 9/02* (2013.01); *F04B 53/006* (2013.01); *F04B 53/14* (2013.01);
(Continued)

(58) Field of Classification Search
CPC ........ B21D 53/28; F04B 1/0538; F04B 53/00; F04B 53/006; F04B 53/14; F04B 53/16;
(Continued)

(56) References Cited

U.S. PATENT DOCUMENTS 3,057,220 A * 10/1962 Parr ........................ F16H 55/14
74/443
2007/0099746 A1* 5/2007 Hahlbeck .................. F16H 1/22
475/331

(Continued)

FOREIGN PATENT DOCUMENTS

CN 202023736 U * 11/2011
WO WO-2013/034861 A1 3/2013

OTHER PUBLICATIONS

Machine Translation of CN 202023736 U PDF file name: "CN202023736U_Machine_Translation.pdf".*

(Continued)

*Primary Examiner* — Grant Moubry
*Assistant Examiner* — Ruben Picon-Feliciano

(57) ABSTRACT

A bull gear is provided for a reciprocating pump. The bull gear includes a hub extending around an axis of rotation of the bull gear. The bull gear includes a rim having a plurality of helical gear teeth extending along a circumference of the rim. The rim extends a width along the axis of rotation from a first side portion to a second side portion that is opposite the first side portion. The bull gear includes a web connecting the hub to the rim. The web extends a radial length from the first side portion of the rim to the hub.

18 Claims, 7 Drawing Sheets

(51) Int. Cl.
    *F04B 53/00*         (2006.01)
    *F04B 53/14*         (2006.01)
    *F04B 53/16*         (2006.01)
    *F16H 55/06*         (2006.01)

(52) U.S. Cl.
    CPC ........ *F04B 53/16* (2013.01); *F16H 2055/065* (2013.01)

(58) Field of Classification Search
    CPC ...... F04B 9/02; F16H 2055/065; F16H 55/14; F16H 55/17
    See application file for complete search history.

(56) References Cited

U.S. PATENT DOCUMENTS

| | | |
|---|---|---|
| 2009/0092510 A1 | 4/2009 | Williams et al. |
| 2010/0129245 A1 | 5/2010 | Patel et al. |
| 2010/0224020 A1* | 9/2010 | Haussecker ............ F16H 55/17 74/425 |
| 2011/0250070 A1* | 10/2011 | Demtroder ............ B23P 11/025 416/170 R |

OTHER PUBLICATIONS

International Search Report and Written Opinion for PCT/US2018/064264 dated Feb. 25, 2019.

\* cited by examiner

PUMP GEAR

CROSS-REFERENCE TO RELATED APPLICATIONS

This application is filed under 35 U.S.C. 371, filed from PCT/US2018/064264 having a filing date of Dec. 6, 2018, which claims the benefit of and priority to U.S. Provisional Patent Application No. 62/595,272 having a filing date of Dec. 6, 2017, all of which are hereby incorporated by reference in their entirety for all purposes.

TECHNICAL FIELD

This disclosure relates to pumps, and, in particular, to gears used in pumps.

BACKGROUND OF THE DISCLOSURE

In oilfield and other industrial operations, reciprocating pumps are used for a variety of different applications. For example, reciprocating pumps are sometimes used as well service pumps in oilfield operations such as fracturing, cementing, acidizing, gravel packing, snubbing, and the like. A reciprocating pump typically includes a power end section and a fluid end section (sometimes referred to as a fluid cylinder or a cylinder section). The power end section includes a crankshaft and a gear set that drives rotation of the crankshaft. In operation, rotation of the crankshaft reciprocates a plunger into and out of the fluid end to thereby pump fluid through the fluid end section.

The gear set of the power end section that drives the crankshaft includes a pinion (sometimes referred to as a power gear) and a larger bull gear (sometimes referred to as a reduction gear) that mesh together at helical teeth thereof. The rim and hub of the bull gear are joined together by a central web that reduces the weight and cost of the bull gear. But, the central web reduces the stiffness of the bull gear, which causes the bull gear to deform when the bull gear and pinion are loaded during operation of the reciprocating pump. The resulting deflection of the rim of the bull gear, as well as deflection of the pinion, reduces the amount of surface contact between the helical teeth of the bull gear and the pinion. The reduced surface contact increases the contact stress experienced by the helical teeth and thereby lowers the fatigue life of the bull gear and/or pinion, which can increase the cost of operating the reciprocating pump and/or add unanticipated and costly downtime for the reciprocating pump.

SUMMARY

This summary is provided to introduce a selection of concepts in a simplified form that are further described below in the Detailed Description. This summary is not intended to identify key features or essential features of the claimed subject matter. Nor is it intended to be used as an aid in determining the scope of the claimed subject matter.

In a first aspect, a bull gear is provided for a reciprocating pump. The bull gear includes a hub extending around an axis of rotation of the bull gear. The bull gear includes a rim having a plurality of helical gear teeth extending along a circumference of the rim. The rim extends a width along the axis of rotation from a first side portion to a second side portion that is opposite the first side portion. The bull gear includes a web connecting the hub to the rim. The web extends a radial length from the first side portion of the rim to the hub.

In one embodiment, the radial length of the web extends at an oblique angle relative to the axis or rotation.

In some embodiments, the web extends a thickness along the axis of rotation from a first face to a second face that is opposite the first face. At least one of the first face or the second face extends at an oblique angle relative to the axis or rotation.

In some embodiments, the web extends a thickness along the axis of rotation from a first face to a second face that is opposite the first face. The first face extends at a first oblique angle relative to the axis or rotation. The second face extends at a second oblique angle relative to the axis of rotation that is different than the first oblique angle.

In one embodiment, the web includes a circumferential groove adjacent the first side portion of the rim.

In some embodiments, the web is joined to the first side portion of the rim at a rim end portion of the web. The rim end portion of the web includes a circumferential groove having a curved bottom.

In some embodiments, the web extends a thickness along the axis of rotation. The thickness of the web is variable along the radial length of the web.

In a second aspect, a gear set is provided for a reciprocating pump. The gear set includes a pinion having a plurality of helical gear teeth, and a bull gear. The bull gear includes a hub extending around an axis of rotation of the bull gear, and a rim having a plurality of helical gear teeth configured to mesh with the helical gear teeth of the pinion. The rim extends a width along the axis of rotation from a first side portion to a second side portion that is opposite the first side portion. The bull gear includes a web connecting the hub to the rim. The web extends a radial length from the first side portion of the rim to the hub.

In one embodiment, the radial length of the web of the bull gear extends at an oblique angle relative to the axis or rotation.

In some embodiments, the web of the bull gear extends a thickness along the axis of rotation from a first face to a second face that is opposite the first face. At least one of the first face or the second face extends at an oblique angle relative to the axis or rotation.

In some embodiments, the web of the bull gear extends a thickness along the axis of rotation from a first face to a second face that is opposite the first face. The first face extends at a first oblique angle relative to the axis or rotation. The second face extends at a second oblique angle relative to the axis of rotation that is different than the first oblique angle.

In some embodiments, the web of the bull gear includes a circumferential groove adjacent the first side portion of the rim.

In some embodiments, the web of the bull gear is joined to the first side portion of the rim at a rim end portion of the web. The rim end portion of the web includes a circumferential groove having a curved bottom.

In some embodiments, the rim of the bull gear is configured to deflect linearly with load.

In one embodiment, the helix angles of the helical gear teeth of the pinion and the helical gear teeth bull gear have opposite hand orientations.

In a third aspect, a reciprocating pump includes a crankshaft and a gear set operatively connected to the crankshaft such that the gear set is configured to drive rotation of the crankshaft. The gear set includes a pinion and a bull gear.

The bull gear includes a hub extending around an axis of rotation of the bull gear, and a rim having a plurality of helical gear teeth extending along a circumference of the rim. The rim extends a width along the axis of rotation from a first side portion to a second side portion that is opposite the first side portion. The bull gear includes a web connecting the hub to the rim. The web extends a radial length from the first side portion of the rim to the hub.

In some embodiments, the radial length of the web of the bull gear extends at an oblique angle relative to the axis or rotation.

In some embodiments, the web of the bull gear includes a circumferential groove adjacent the first side portion of the rim.

In some embodiments, the rim of the bull gear is configured to deflect linearly with load.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

The accompanying drawings facilitate an understanding of the various embodiments.

Corresponding reference characters indicate corresponding parts throughout the drawings.

DETAILED DESCRIPTION

Certain embodiments of the disclosure provide a bull gear for a reciprocating pump. The bull gear includes a hub extending around an axis of rotation of the bull gear. The bull gear includes a rim having a plurality of helical gear teeth extending along a circumference of the rim. The rim extends a width along the axis of rotation from a first side portion to a second side portion that is opposite the first side portion. The bull gear includes a web connecting the hub to the rim. The web extends a radial length from the first side portion of the rim to the hub.

Certain embodiments of the disclosure provide a bull gear having a self-compensating deflection under load that provides and/or maintains a predetermined amount of surface contact between gear teeth of the bull gear and a pinion during operation of a reciprocating pump. Certain embodiments of the disclosure reduce the contact stress experienced by helical gear teeth and thereby increase the fatigue capacity and/or life of a bull gear and/or a pinion, which can extend the longevity of the bull gear and/or pinion. Certain embodiments of the disclosure increase the strength, reduce sliding velocity, decrease pitting, decrease scuffing, and/or the like of gear teeth. Certain embodiments of the disclosure prevent premature failure of a bull gear and/or a pinion of a reciprocating pump, which reduces damage to reciprocating pumps caused by such premature failures. Certain embodiments of the disclosure decrease the downtime of reciprocating pumps and/or reduce the operating cost of reciprocating pumps.

Figure 1:
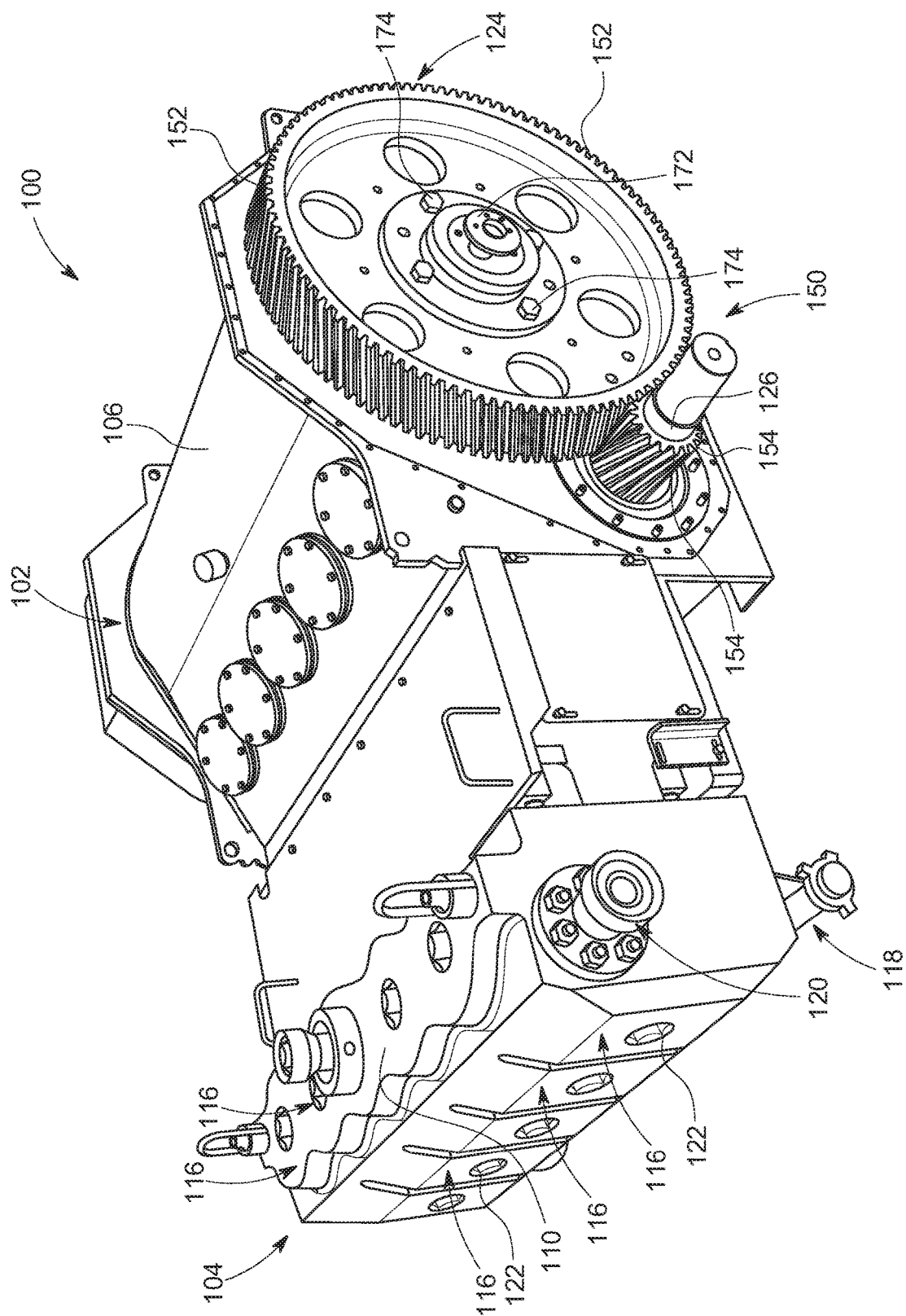
FIG. 1 is a perspective view of a reciprocating pump according to an exemplary embodiment.
Figure 2:
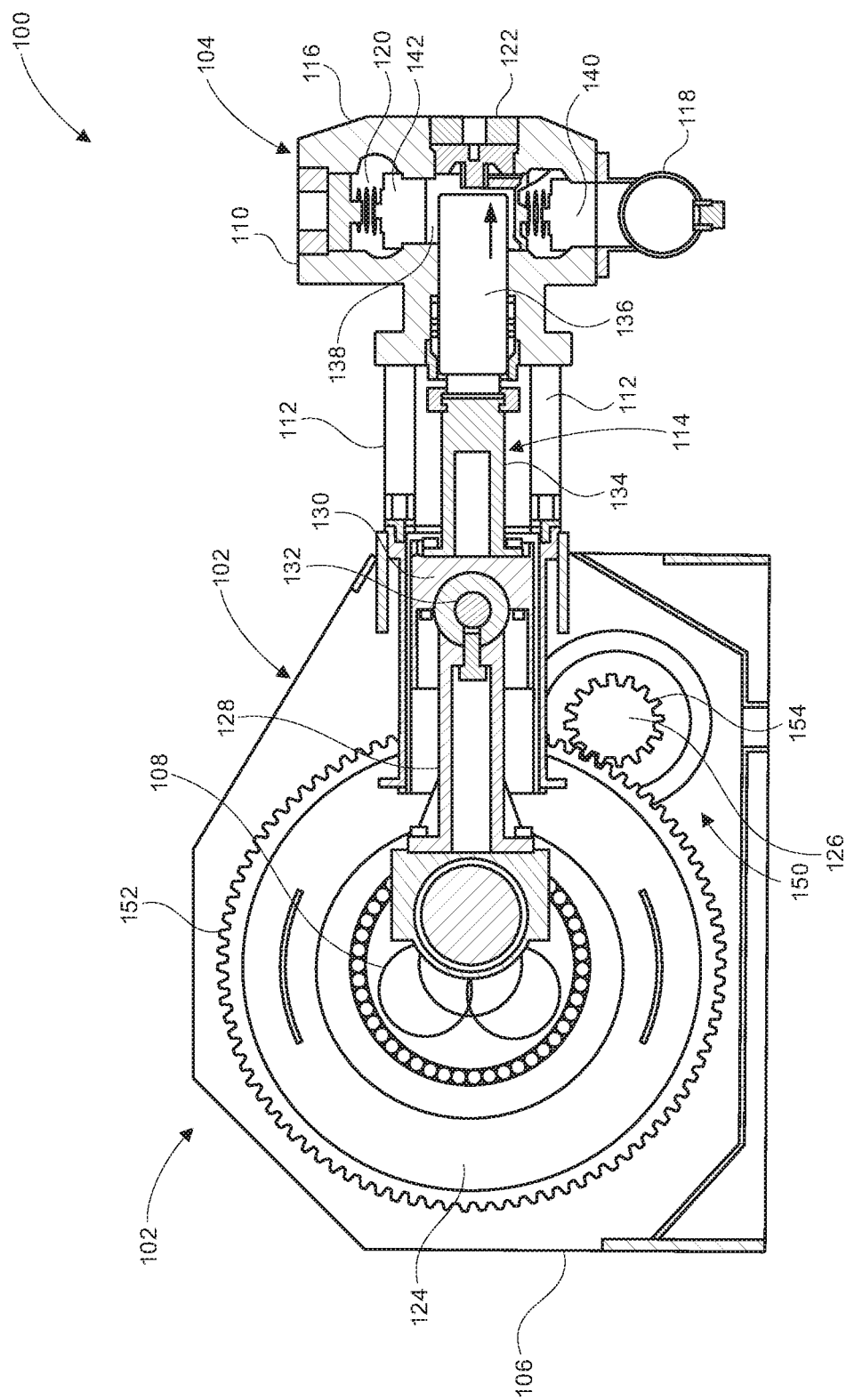
FIG. 2 is a cross-sectional view of the reciprocating pump shown in FIG. 1 according to an exemplary embodiment.

Referring to FIGS. 1 and 2, an illustrative embodiment of a reciprocating pump 100 is presented. The reciprocating pump assembly 100 includes a power end section 102 and a fluid end section 104 operably coupled thereto. The power end section 102 includes a housing 106 in which a crankshaft 108 (not visible in FIG. 1) is disposed. As will be described in more detail below, rotation of the crankshaft 108 is driven by an engine or motor (not shown) of the power end portion 102. The fluid end section 104 includes a fluid cylinder 110 (sometimes referred to as a "cylinder section"). In the exemplary embodiment, the power end section 102 is coupled to the fluid end section 104 via a plurality of stay rods and/or tubes 112 (not visible in FIG. 1). In other words, the stay rods and/or tubes 112 hold the power end section 102 and the fluid end section 104 together. Other structures may be used to connect the fluid end section 104 to the power end section 102 in addition or alternatively to the stay rods 112. In operation, the crankshaft 108 reciprocates a plunger rod assembly 114 (not visible in FIG. 1) between the power end section 102 and the fluid end section 104 to thereby pump (i.e., move) fluid through the fluid cylinder 110.

In the example shown in FIGS. 1 and 2, the fluid cylinder 110 of the fluid end section 104 includes a bank of cylinders 116, each of which are fluidly connected to a fluid inlet 118 and a fluid outlet 120. Each cylinder 116 is capped with a suction cover plate 122. Although the fluid cylinder 110 is shown with three cylinders 116, the fluid cylinder 110 can include any number of the cylinders 116. According to some examples, the reciprocating pump 100 is freestanding on the ground, mounted to a trailer for towing between operational sites, mounted to a skid, loaded on a manifold, otherwise transported, and/or the like.

The power end section 102 of the reciprocating pump 100 includes a gear set 150 that includes a bull gear 124 (sometimes referred to as a "reduction gear") and a pinion 126 (sometimes referred to as a "power gear"). A portion of the housing 106 has been removed from the power end section 102 in FIG. 1 to illustrate the gear set 150. The gear set 150 drives rotation of the crankshaft 108. More particularly, the pinion 126 is mechanically connected to the engine or motor such that the engine or motor drives rotation of the pinion 126. The bull gear 124 and the pinion 126 each include a plurality of helical gear teeth 152 and 154, respectively. As is shown in FIGS. 1 and 2, the helical gear teeth 152 and 154 mesh together to rotatably connect the bull gear 124 to the pinion 126 such that rotation of the pinion 126 drives rotation of the bull gear 124. In some examples, the power end section 102 of the reciprocating pump 100 includes another bull gear (not shown, e.g., adjacent an opposite side of the power end section 102 than the side on which the bull gear 124 is shown in FIG. 1) that meshes with gear teeth (not shown) on an opposite end of the pinion 126 from the end of the pinion 126 that is shown in FIG. 1.

Referring now solely to FIG. 2, the housing 106 houses the crankshaft 108, which is mechanically connected to the bull gear 124 for rotation therewith. In some examples, the crankshaft 108 operates each cylinder 116 to pump fluids at alternating times. In the example of FIG. 2, a connecting rod 128 connects the crankshaft 108 to a crosshead 130 through a crosshead pin 132. The connecting rod 128 is pivotable about the crosshead pin 132 as the crankshaft 108 rotates with the opposite end of the connecting rod 128. A plunger rod 134 (sometimes referred to as a "pony rod") of the plunger rod assembly 114 extends from the crosshead 130 to a plunger 136 of the plunger rod assembly 114. During operation, the connecting rod 128 and the crosshead 130 convert rotational movement of the crankshaft 108 into longitudinal movement of the plunger rod 134 to drive the reciprocating movement of the plunger 136 into and out of the fluid cylinder 110.

In the example of FIG. 2, the fluid cylinder 110 includes an interior or cylinder chamber 138, in which the plunger 136 pressurizes the fluid being pumped by the reciprocating pump 100. The fluid cylinder 110 further includes an inlet valve 140 and an outlet valve 142, both of which can be spring-loaded valves actuated by a pre-determined differential pressure or another type of valve. The inlet valve 140 actuates to control fluid flow through the fluid inlet 118 into the cylinder chamber 138. The outlet valve 142 actuates to control fluid flow through the fluid outlet 120 from the cylinder chamber 138.

During operation, as the plunger 136 moves away from the cylinder chamber 138, the fluid pressure in the cylinder chamber 138 decreases creating a pressure difference across the inlet valve 140. The pressure difference opens the inlet valve 140 to allow the fluid to enter the cylinder chamber 138 from the inlet 118. The fluid enters the cylinder chamber 138 as the plunger 136 continues to move longitudinally away from the cylinder chamber 138 until the pressure difference between the fluid inside the cylinder chamber 138 and the fluid in the fluid inlet 118 equalizes and the inlet valve 140 returns to its closed position.

When the plunger 136 reverses direction and moves toward the cylinder chamber 138, the fluid pressure inside the cylinder chamber 138 increases and creates a pressure difference across the outlet valve 142. Before the outlet valve 142 opens, however, the fluid pressure in the cylinder chamber 138 continues to increase as the plunger 136 approaches the cylinder chamber 138 until the pressure difference is large enough to actuate the outlet valve 142 and enable fluid to exit the cylinder chamber 138 through the fluid outlet 120. In some examples, fluid is pumped across one side of the plunger 136 (e.g., single acting, etc.), while in other examples (not shown) fluid is pumped across both sides of the plunger 136 (e.g., double acting, etc.).

Although described and illustrated with respect to a reciprocating pump of the plunger rod type, the bull gear and pinion embodiments described and/or or illustrated herein are not limited to reciprocating pumps, plunger rod pumps, and/or the like. Rather, the embodiments of bull gears and pinions disclosed herein can be used with any other type of pump.

Figure 3:
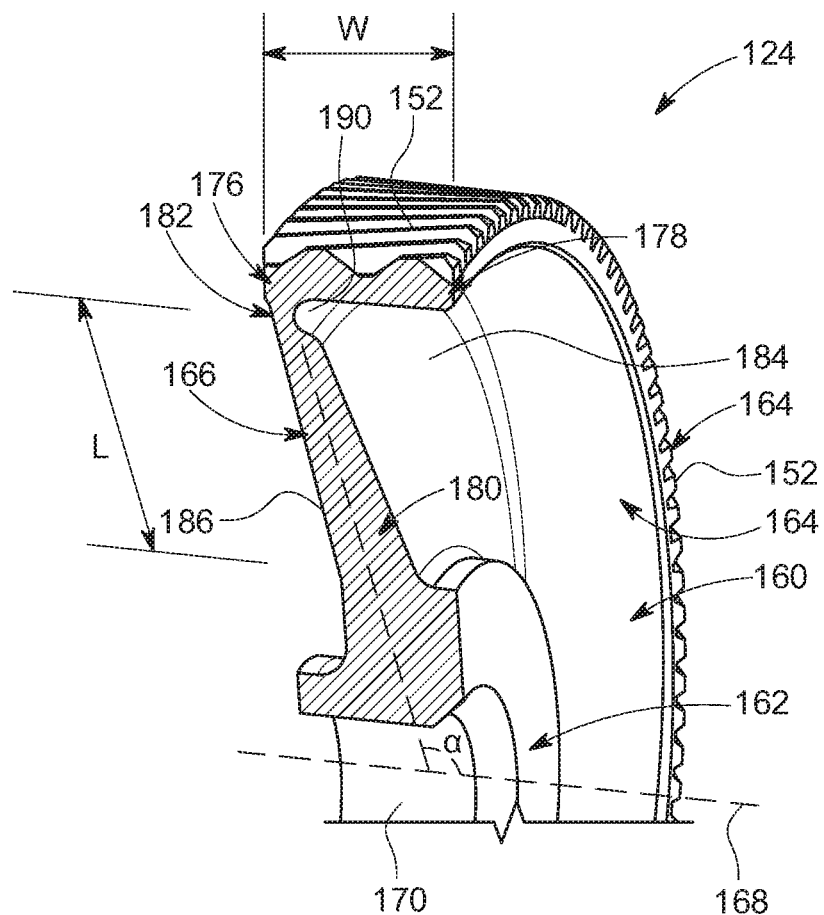
FIG. 3 is a cross-sectional view of a portion of a bull gear of the reciprocating pump shown in FIGS. 1 and 2 according to an exemplary embodiment.

Referring now to FIG. 3, an exemplary embodiment of a bull gear 124 has a body 160 that includes a hub 162, a rim 164, and a web 166. An axis of rotation 168 extends through the body 160. During operation of the reciprocating pump 100 (shown in FIGS. 1 and 2), the body 160 of the bull gear 124 rotates about the axis or rotation 168. As can be seen in FIG. 3, the hub 162 extends around the axis of rotation 168. In the exemplary embodiment, the hub 162 includes a central opening 170 that is configured to receive and/or otherwise accommodate a fastener (e.g., the fastener 172 shown in FIG. 1) and/or an end portion of the crankshaft 108 (shown in FIG. 2) to facilitate connecting the bull gear 124 to the crankshaft 108. In addition or alternatively to the central opening 170, the hub 168 of the bull gear 124 can include any other structure that enables the crankshaft 108 to be connected to the bull gear 124 for rotation therewith (e.g., one or more openings that receive a fastener 174 shown in FIG. 1).

The rim 164 of the body 160 extends a width W along the axis of rotation 168 from a side portion 176 to a side portion 178 that is opposite the side portion 176. The rim 164 includes the helical gear teeth 152. More particularly, the helical gear teeth 152 extend radially outward (relative to the axis of rotation 168) along a circumference of the rim 164. The helical gear teeth 152 can have any helix angle, any lead angle, and any pitch angle, each of which may be selected to facilitate providing and/or maintaining a predetermined amount of surface contact of the helical gear teeth 152 with the helical gear teeth 154 (shown in FIGS. 1, 2, and 5) of the pinion 126 (shown in FIGS. 1, 2, and 5) during operation of the reciprocating pump 100 (e.g., during deflection of the rim 164 of the bull gear 124 and/or during deflection of the pinion 126). The body 160 of the bull gear 124 can include any number of the helical gear teeth 152. Each of the side portion 176 and the side portion 178 may be referred to herein as a "first side portion" and/or a "second side portion".

In the exemplary embodiment, the helical gear teeth 152 of the bull gear 124 have a left hand orientation, but in other embodiments the helical gear teeth 152 can have a right hand orientation. Moreover, and referring again to FIG. 1, the exemplary embodiment of the helical gear teeth 154 of the pinion 126 have a left hand orientation such that the helical gear teeth 152 of the bull gear 124 and the helical gear teeth 154 of the pinion 126 have opposite hand orientations in the exemplary embodiment. But, in other embodiments, the helical gear teeth 152 of the bull gear 124 have a right hand orientation and the helical gear teeth 154 of the pinion 126 have a left hand orientation. Providing the helical gear teeth 152 and 154 with opposite hand orientations can facilitate providing and/or maintaining a predetermined amount of surface contact between the helical gear teeth 152 and 154 of the bull gear 124 and the pinion 126, respectively during operation of the reciprocating pump 100 (e.g., during deflection of the rim 164 of the bull gear 124 and/or during deflection of the pinion 126).

In other embodiments, the helical gear teeth 152 and 154 of the bull gear 124 and the pinion 126, respectively, have the same hand orientation as each other (whether the same orientation is a left or a right hand orientation). Although shown and described herein as being helical gear teeth, in other embodiments the gear teeth 152 can be straight (i.e., approximately parallel to the axis of rotation 168) such that the bull gear 124 is a spur gear.

Referring again to FIG. 3, the web 166 of the body 160 connects the hub 162 to the rim 164. More particularly, the web 166 extends radially outward from the hub 162 and to the rim 164 to join the hub 162 and the rim 164 together. In other words, the web 166 extends a radial length L between the hub 162 and the rim 164. The web 166 extends the radial length L from a hub end portion 180 that is joined to the hub 162 to an opposite rim end portion 182 that is joined to the rim 164. The web 166 extends a thickness along the axis of rotation 168 from a face 184 to a face 186 that is opposite the face 184. Each of the face 184 and the face 186 may be referred to herein as a "first face" and/or a "second face".

As can be seen in FIG. 3, the web 166 extends the radial length L from the side portion 176 of the rim 164 to the hub 162. In other words, the rim end portion 182 of the web 166 is joined to the rim 164 at the side portion 176 of the rim 164. Alternatively, the rim end portion 182 of the web 166 is jointed to the rim 164 at the side portion 178 of the rim 164. As can also be seen in FIG. 3, the radial length L of the web 166 extends an oblique angle α relative to the axis of rotation 168. In the exemplary embodiment, each of the faces 184 and 186 of the web 166 extends at an oblique angle relative to the axis of rotation 168. But, in other embodiments, the face 184 or the face 186 extends at an approximately perpendicular angle relative to the axis of rotation 168. In the example shown in FIG. 3, the oblique angle of the face 184 relative to the axis of rotation 168 is different than the oblique angle of the face 186 relative to the axis of rotation 168 such that the thickness of the web 166 is variable along the radial length L of the web 166. But, the faces 184 and 186 of the web 166 extend at approximately the same oblique angle relative to the axis of rotation 168 in other embodiments.

Optionally, the web 166 includes a circumferential groove 190. As shown in FIG. 3, the exemplary groove 190 includes a curved bottom 192, but the groove 190 can additionally or alternatively include other shapes. In the exemplary embodiment, the groove 190 extends into the face 184 adjacent the side portion 176 of the rim 164. In other words, the groove 190 extends into the web 166 at the rim end portion 182 of the web 166. But, the groove 190 can extend at any other location along the radial length L of the web 166. In some other examples, the web 166 includes a groove (not shown) that extends into the face 186 of the web 166 in addition or alternative to the groove 190. In still other examples, the web 166 does not include a groove within the face 184 (e.g., the circumferential groove 190) and does not include a groove within the face 186.

Figure 4:
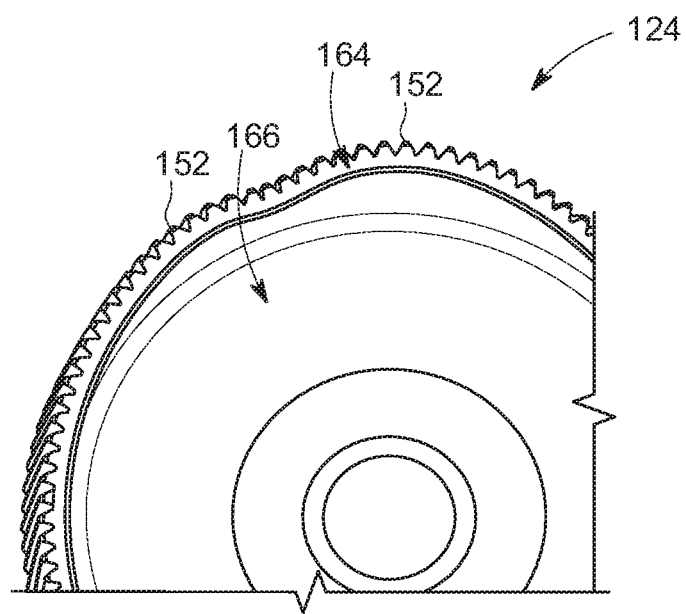
FIG. 4 is a perspective view of the bull gear shown in FIG. 3 illustrating an exemplary deflection of the bull gear during operation of the reciprocating pump according to an exemplary embodiment.

During operation of the reciprocating pump 100, the pinion 126 and the rim 164 of the bull gear 124 deflect under loading thereof. FIG. 4 illustrates an example of the deflection of the rim 164 of the bull gear 124 during operation of the reciprocating pump 100 (shown in FIGS. 1 and 2). The deflection shown in FIG. 4 has been exaggerated for illustrative purposes.

The geometry of the web 166 of the bull gear 124 disclosed herein (e.g., the geometry of the web 166 shown in FIG. 3, etc.) configures the rim 164 of the bull gear 124 to deflect during operation of the reciprocating pump 100 (i.e., under operational loading) in a manner that compensates for both the deflection of the rim 164 and the deflection of the pinion 126 (shown in FIGS. 1, 2, and 5) such that the directions of the resulting deflections of the helical gear teeth 152 and 154 (shown in FIGS. 1, 2, and 5) are complementary with each other. In other words, the geometry of the web 166 disclosed herein (e.g., the geometry of the web 166 shown in FIG. 3, etc.) is self-compensating such that as the rim 164 of the bull gear 124 deflects in a motion that aligns the helical gear teeth 152 of the bull gear 124 with the helical gear teeth 154 of the pinion 126. The self-compensating deflection of the bull gear 124 provides and/or maintains a predetermined amount of surface contact (e.g., increases the area of surface contact, etc.) between the respective helical gear teeth 152 and 154 of the bull gear 124 and the pinion 126 (e.g., an optimized amount of surface contact across the full faces of the gear teeth 152 and 154, etc.) during operation of the reciprocating pump 100. Moreover, the geometry of the web 166 of the bull gear 124 disclosed herein (e.g., the geometry of the web 166 shown in FIG. 3, etc.) configures the rim 164 of the bull gear 124 such that the rim 164 deforms (i.e., deflects) linearly with load during operation of the reciprocating pump 100. Accordingly, the resulting deflections of the helical gear teeth 152 and 154 remain complementary with each other at all loads such that the predetermined amount of surface contact therebetween is provided and/or maintained at all loads.

Referring again to FIG. 3, various parameters such as, but not limited to, the material(s), geometry (e.g., the oblique angle α of the length L of the web, the size, shape, location, and/or the like of the groove 190, the thickness(es) of the web 166, the oblique angles of the faces 184 and 186, etc.), and/or the like of the web 166 of the bull gear 124 can be selected to enable the self-compensating deflection of the bull gear 124 that provides and/or maintains the predetermined amount of surface contact between the helical gear teeth 152 and 154 during operation of the reciprocating pump 100.

Figure 5:
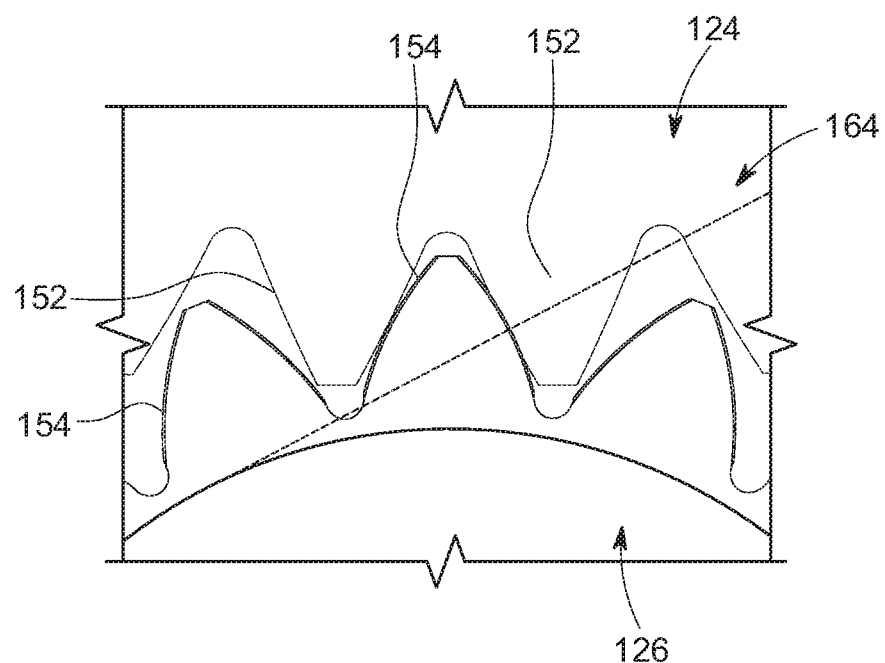
FIG. 5 is an elevational view illustrating an exemplary mesh of the bull gear shown in FIGS. 3 and 4 with a pinion of the reciprocating pump according to an exemplary embodiment.

FIG. 5 illustrates an exemplary mesh of the helical gear teeth 152 of the bull gear 124 with the helical gear teeth 154 of the pinion 126 during operation of the reciprocating pump 100 (shown in FIGS. 1 and 2). FIG. 5 illustrates an example of a predetermined amount of surface contact between the gear teeth 152 and 154 resulting from the self-compensating deflection of the rim 164 of the bull gear 124. In some examples, the geometry (e.g., profile, etc.) of the helical gear teeth 154 of the pinion 126 is selected to facilitate providing and/or maintaining the predetermined amount of surface contact between the helical gear teeth 152 and 154. The geometry of the helical gear teeth 152 and/or the helical gear teeth 154 can be selected to increase (e.g., optimize, etc.) the strength of the teeth 152 and/or 154, to reduce sliding velocity, and/or the like. FIG. 5 illustrates an example of the geometry of the gear teeth 152 and 154 according to an exemplary embodiment.

The embodiments described and/or illustrated can improve the spread of the load between the helical gear teeth of the bull gear and the pinion (e.g., by increasing the area of surface contact, etc.) and thereby reduce the contact stress experienced by the helical gear teeth. The reduced contact stress experienced by the helical gear teeth can increase the fatigue capacity and/or life of a bull gear and/or a pinion, which can extend the longevity of the bull gear and/or pinion. The embodiments described and/or illustrated herein can increase the strength, reduce sliding velocity, decrease pitting, decrease scuffing, and/or the like of gear teeth. The embodiments described and/or illustrated herein can prevent premature failure of a bull gear and/or a pinion of a reciprocating pump, which can reduce damage to reciprocating pumps caused by such premature failures. The embodiments described and/or illustrated herein can decrease the downtime of reciprocating pumps, reduce the operating cost of reciprocating pumps, and/or the like.

Figure 6:
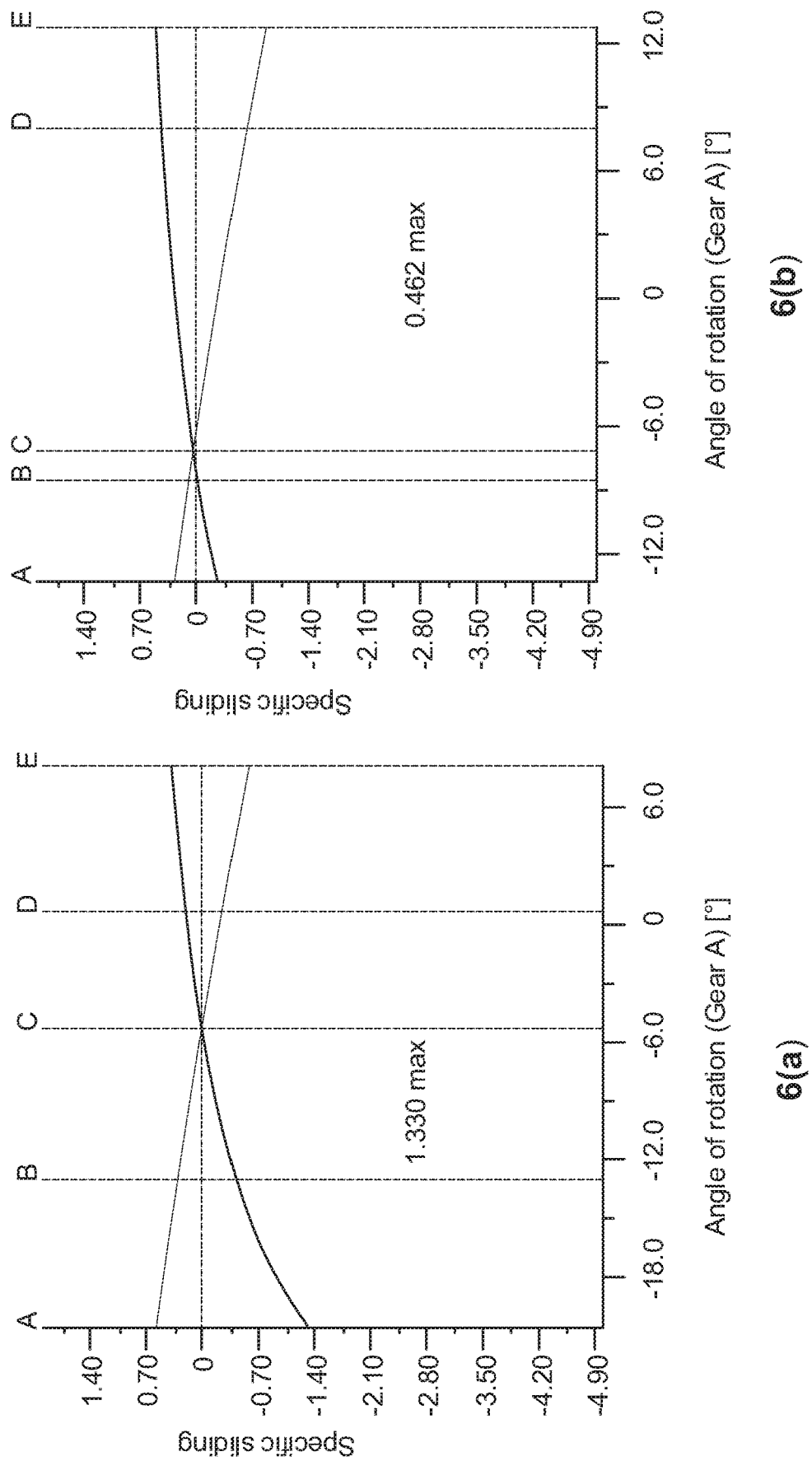
FIG. 6 illustrates the sliding ratio of the gear teeth of the bull gear and pinion shown in FIG. 5 as compared to the gear teeth of a conventional bull gear and a conventional pinion.

FIG. 6a is a graph illustrating the sliding ratio of the helical gear teeth of a conventional bull gear and a conventional pinion. FIG. 6b is a graph illustrating the sliding ratio of the helical gear teeth 152 (shown in FIGS. 1-5) of the bull gear 124 (shown in FIGS. 1-5) and the helical gear teeth 154 (shown in FIGS. 1, 2, and 5) of the pinion 125 (shown in FIGS. 1, 2, and 5). As can be seen by a comparison of FIGS. 6a and 6b, the helical gear teeth 152 and 154 exhibit an improved (e.g., reduced, etc.) sliding ratio therebetween in FIG. 6b as compared to the sliding ratio of the conventional bull gear and conventional pinion exhibited in FIG. 6a.

Figure 7:
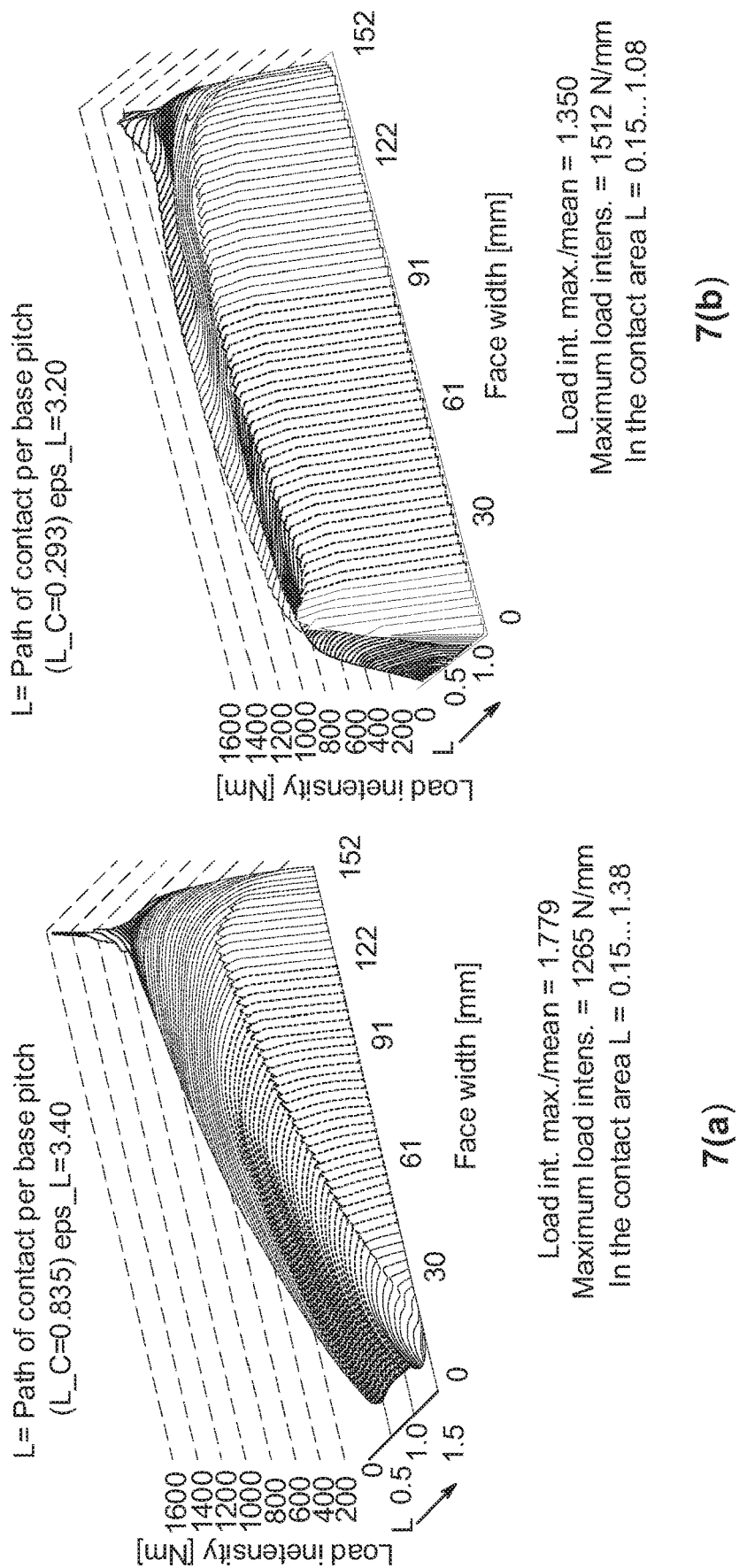
FIG. 7 illustrates finite element analysis (FEA) of the contact distribution of the bull gear and pinion shown in FIG. 5 as compared to the gear teeth of a conventional bull gear and a conventional pinion.

FIG. 7(a) is a graph illustrating the results of a finite element analysis (FEA) of the contact distribution of the helical gear teeth of a conventional bull gear and a conventional pinion. FIG. 7(b) is a graph illustrating the results of an FEA of the contact distribution of the helical gear teeth 152 (shown in FIGS. 1-5) of the bull gear 124 (shown in FIGS. 1-5) and the helical gear teeth 154 (shown in FIGS. 1, 2, and 5) of the pinion 125 (shown in FIGS. 1, 2, and 5). As shown in FIG. 7b, the surface contact distribution of the respective helical gear teeth 152 and 154 of the bull gear 124 and the pinion 126 exhibits a relatively substantial improvement as compared to the contact distribution of the helical gear teeth of the conventional bull gear and conventional pinion shown in FIG. 7a.

The following clauses describe further aspects of the disclosure:

Clause Set A:

A1. A bull gear for a reciprocating pump, the bull gear comprising:
  a hub extending around an axis of rotation of the bull gear;
  a rim having a plurality of helical gear teeth extending along a circumference of the rim, the rim extending a width along the axis of rotation from a first side portion to a second side portion that is opposite the first side portion; and
  a web connecting the hub to the rim, the web extending a radial length from the first side portion of the rim to the hub.

A2. The bull gear of clause A1, wherein the radial length of the web extends at an oblique angle relative to the axis or rotation.

A3. The bull gear of clause A1, wherein the web extends a thickness along the axis of rotation from a first face to a second face that is opposite the first face, at least one of the first face or the second face extending at an oblique angle relative to the axis or rotation.

A4. The bull gear of clause A1, wherein the web extends a thickness along the axis of rotation from a first face to a second face that is opposite the first face, the first face extending at a first oblique angle relative to the axis or rotation, the second face extending at a second oblique angle relative to the axis of rotation that is different than the first oblique angle.

A5. The bull gear of clause A1, wherein the web comprises a circumferential groove adjacent the first side portion of the rim.

A6. The bull gear of clause A1, wherein the web is joined to the first side portion of the rim at a rim end portion of the web, the rim end portion of the web comprising a circumferential groove having a curved bottom.

A7. The bull gear of clause A1, wherein the web extends a thickness along the axis of rotation, the thickness of the web being variable along the radial length of the web.

A8. The bull gear of clause A1, wherein the rim is configured to deflect linearly with load.

Clause Set B:

B1. A gear set for a reciprocating pump, the gear set comprising:
  a pinion having a plurality of helical gear teeth; and
  a bull gear comprising:
  a hub extending around an axis of rotation of the bull gear;
  a rim having a plurality of helical gear teeth configured to mesh with the helical gear teeth of the pinion, the rim extending a width along the axis of rotation from a first side portion to a second side portion that is opposite the first side portion; and
  a web connecting the hub to the rim, the web extending a radial length from the first side portion of the rim to the hub.

B2. The gear set of clause B1, wherein the radial length of the web of the bull gear extends at an oblique angle relative to the axis or rotation.

B3. The gear set of clause B1, wherein the web of the bull gear extends a thickness along the axis of rotation from a first face to a second face that is opposite the first face, at least one of the first face or the second face extending at an oblique angle relative to the axis or rotation.

B4. The gear set of clause B1, wherein the web of the bull gear extends a thickness along the axis of rotation from a first face to a second face that is opposite the first face, the first face extending at a first oblique angle relative to the axis or rotation, the second face extending at a second oblique angle relative to the axis of rotation that is different than the first oblique angle.

B5. The gear set of clause B1, wherein the web of the bull gear comprises a circumferential groove adjacent the first side portion of the rim.

B6. The gear set of clause B1, wherein the web of the bull gear is joined to the first side portion of the rim at a rim end portion of the web, the rim end portion of the web comprising a circumferential groove having a curved bottom.

B7. The gear set of clause B1, wherein the rim of the bull gear is configured to deflect linearly with load.

B8. The gear set of clause B1, wherein the helix angles of the helical gear teeth of the pinion and the helical gear teeth bull gear have opposite hand orientations.

Clause Set C:

C1. A reciprocating pump comprising:
  a crankshaft; and
  a gear set operatively connected to the crankshaft such that the gear set is configured to drive rotation of the crankshaft, the gear set comprising a pinion and a bull gear, the bull gear comprising:
    a hub extending around an axis of rotation of the bull gear;
    a rim having a plurality of helical gear teeth extending along a circumference of the rim, the rim extending a width along the axis of rotation from a first side portion to a second side portion that is opposite the first side portion; and
    a web connecting the hub to the rim, the web extending a radial length from the first side portion of the rim to the hub.

C2. The reciprocating pump of clause C1, wherein the radial length of the web of the bull gear extends at an oblique angle relative to the axis or rotation.

C3. The reciprocating pump of clause C1, wherein the web of the bull gear comprises a circumferential groove adjacent the first side portion of the rim.

C4. The reciprocating pump of clause C1, wherein the rim of the bull gear is configured to deflect linearly with load.

It is to be understood that the above description is intended to be illustrative, and not restrictive. For example, the above-described embodiments (and/or aspects thereof) may be used in combination with each other. Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Further, each independent feature or component of any given assembly may constitute an additional embodiment. In addition, many modifications may be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "clockwise" and "counterclockwise", "left" and right", "front" and "rear", "above" and "below" and the like are used as words of convenience to provide reference points and are not to be construed as limiting terms.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. For example, in this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised", "comprises", "having", "has", "includes", and "including" where they appear. The term "exemplary" is intended to mean "an example of." The phrase "one or more of the following: A, B, and C" means "at least one of A and/or at least one of B and/or at least one of C." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Although the terms "step" and/or "block" may be used herein to connote different elements of methods employed, the terms should not be interpreted as implying any particular order among or between various steps herein disclosed unless and except when the order of individual steps is explicitly described. The order of execution or performance of the operations in examples of the disclosure illustrated and described herein is not essential, unless otherwise specified. The operations may be performed in any order, unless otherwise specified, and examples of the disclosure may include additional or fewer operations than those disclosed herein. It is therefore contemplated that executing or performing a particular operation before, contemporaneously with, or after another operation is within the scope of aspects of the disclosure.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A bull gear for a reciprocating pump, the bull gear comprising:
   a hub extending around an axis of rotation of the bull gear;
   a rim having a plurality of helical gear teeth extending along a circumference of the rim, the rim extending a width along the axis of rotation from a first side to a second side that is opposite the first side; and
   a web connecting the hub to the rim, the web extending a radial length from the first side of the rim to the hub, wherein the web is joined to the rim at the first side of the rim,
   wherein the web extends a thickness along the axis of rotation from a first face to a second face that is opposite the first face, the thickness of the web being variable substantially along the radial length of the web,
   wherein a first thickness of the web at the hub is greater than a second thickness of the web at the rim to facilitate deflection of the rim,
   wherein the web includes a groove, extending into the second face, having a third thickness less than the first thickness and the second thickness,
   wherein the thickness of the web decreases, along the radial length of the web, from the hub to the groove, and
   wherein the thickness of the web increases, along the radial length of the web, from the groove to the rim.

2. The bull gear of claim 1, wherein the radial length of the web extends at an oblique angle relative to the axis of rotation.

3. The bull gear of claim 1, wherein at least one of the first face or the second face extends at an oblique angle relative to the axis of rotation.

4. The bull gear of claim 1, wherein the first face extends at a first oblique angle relative to the axis of rotation, and wherein the second face extends at a second oblique angle relative to the axis of rotation that is different than the first oblique angle.

5. The bull gear of claim 1, wherein the groove comprises a circumferential groove.

6. The bull gear of claim 5, wherein the web is joined to the first side of the rim at a rim end portion of the web, the rim end portion of the web comprising the circumferential groove having a curved bottom.

7. The bull gear of claim 1, wherein the rim is configured to deflect linearly with load.

8. The bull gear of claim 1, wherein the first face of the web is joined to the rim, and at least a portion of the first face defines a recess.

9. A bull gear comprising:
   a hub extending around an axis of rotation of the bull gear;
   a rim having a plurality of helical gear teeth extending along a circumference of the rim, the rim extending a width along the axis of rotation from a first side to a second side that is opposite the first side; and
   a web connecting the hub to the rim, the web extending a radial length from the first side of the rim to the hub, wherein the web is joined to the rim at the first side of the rim, wherein the web extends a thickness along the axis of rotation from a first face to a second face that is opposite the first face, the thickness of the web being variable substantially along the radial length of the web such that the thickness of the web is greater at the hub than at the rim to facilitate deflection of the rim, wherein the first face of the web extends at a first oblique angle relative to the axis of rotation, wherein the second face of the web extends at a second oblique angle relative to the axis of rotation that is different from the first oblique angle, and wherein both the first and second oblique angles are oriented towards the first side of the rim and away from the second side of the rim.

10. The bull gear of claim 9, wherein the radial length of the web of the bull gear extends at an oblique angle relative to the axis of rotation.

11. The bull gear of claim 9, wherein the web of the bull gear comprises a circumferential groove adjacent the first side of the rim.

12. The bull gear of claim 9, wherein the web of the bull gear is joined to the first side of the rim at a rim end portion of the web, the rim end portion of the web comprising a circumferential groove having a curved bottom.

13. The bull gear of claim 9, wherein the rim of the bull gear is configured to deflect linearly with load.

14. The bull gear of claim 9, wherein the first face of the web is joined to the rim, and at least a portion of the first face defines a recess.

15. The bull gear of claim 9,
wherein a first thickness of the web at the hub is greater than a second thickness of the web at the rim,
wherein the web includes a groove, extending into the second face, having a third thickness less than the first thickness and the second thickness,
wherein the thickness of the web decreases, along the radial length of the web, from the hub to the groove, and
wherein the thickness of the web increases, along the radial length of the web, from the groove to the rim.

16. A reciprocating pump comprising:
a crankshaft; and
a gear set operatively connected to the crankshaft such that the gear set is configured to drive rotation of the crankshaft, the gear set comprising a pinion and a bull gear, the bull gear comprising:
a hub extending around an axis of rotation of the bull gear;
a rim having a plurality of helical gear teeth extending along a circumference of the rim, the rim extending a width along the axis of rotation from a first side to a second side that is opposite the first side; and
a web connecting the hub to the rim, the web extending a radial length from the first side of the rim to the hub, wherein the web is joined to the rim at the first side of the rim,
wherein the web extends a thickness along the axis of rotation from a first face to a second face that is opposite the first face, the thickness of the web being variable substantially along the radial length of the web such that the thickness of the web is greater at the hub than at the rim to facilitate deflection of the rim,
wherein the first face of the web extends at a first oblique angle relative to the axis of rotation,
wherein the second face of the web extends at a second oblique angle relative to the axis of rotation that is different from the first oblique angle, and
wherein both the first and second oblique angles are oriented towards the first side of the rim and away from the second side of the rim.

17. The reciprocating pump of claim 16, wherein the radial length of the web of the bull gear extends at an oblique angle relative to the axis of rotation.

18. The reciprocating pump of claim 16, wherein the web of the bull gear comprises a circumferential groove adjacent the first side of the rim.

* * * * *